(12) United States Patent
Yie

(10) Patent No.: US 8,505,583 B2
(45) Date of Patent: Aug. 13, 2013

(54) METHOD AND APPARATUS FOR GENERATING HIGH-SPEED PULSED FLUID JETS

(76) Inventor: Gene G. Yie, Grants Pass, OR (US)

( * ) Notice: Subject to any disclaimer, the term of this patent is extended or adjusted under 35 U.S.C. 154(b) by 378 days.

(21) Appl. No.: 12/804,051

(22) Filed: Jul. 12, 2010

(65) Prior Publication Data

US 2012/0007009 A1  Jan. 12, 2012

(51) Int. Cl.
*F16K 31/122* (2006.01)
(52) U.S. Cl.
USPC ............................ 137/826; 137/830; 137/509
(58) Field of Classification Search
USPC ................................ 137/509, 826, 830, 224.5
See application file for complete search history.

(56) References Cited

U.S. PATENT DOCUMENTS

| | | | |
|---|---|---|---|
| 3,924,805 A | 12/1975 | Nebeker et al. | |
| 4,142,972 A | 3/1979 | Nebeker et al. | |
| 4,478,368 A | 10/1984 | Yie | |
| 4,534,427 A | 8/1985 | Wang et al. | |
| 4,555,872 A | 12/1985 | Yie | |
| 4,666,083 A | 5/1987 | Yie | |
| 4,765,540 A | 8/1988 | Yie | |
| 4,768,709 A | 9/1988 | Yie | |
| 4,862,911 A | 9/1989 | Yie | |
| 5,092,362 A | 3/1992 | Yie | |
| 5,117,872 A | 6/1992 | Yie | |
| 5,154,347 A | 10/1992 | Vijay | |
| 5,186,393 A | 2/1993 | Yie | |
| 5,241,986 A | 9/1993 | Yie | |
| 5,297,777 A | 3/1994 | Yie | |
| 5,429,304 A * | 7/1995 | Tomita et al. | 239/119 |
| 5,524,821 A | 6/1996 | Yie et al. | |
| 5,794,854 A | 8/1998 | Yie | |
| 5,799,688 A | 9/1998 | Yie | |
| 5,879,137 A | 3/1999 | Yie | |
| 5,927,329 A | 7/1999 | Yie | |
| 6,179,574 B1 | 1/2001 | Yie | |
| 6,206,649 B1 | 3/2001 | Yie | |
| 6,431,465 B1 | 8/2002 | Yie | |
| 6,588,724 B2 | 7/2003 | Yie | |

FOREIGN PATENT DOCUMENTS

JP    7-94414    3/1995

OTHER PUBLICATIONS

Co-Pending U.S. Appl. No. 12/925,261, filed Oct. 18, 2010; inventor Gene G. Yie; title On-Off Valves for High Pressure Fluids.
Abandoned U.S. Appl. No. 07/891,568, filed May 29, 1992; inventor G. Yie; title High-Pressure Fluid Control Valve.
Abandoned U.S. Appl. No. 09/231,313, filed Jan. 13, 1999; inventor Gene G. Yie; title High-Pressure, High-Flow Fluid Control Valve.

(Continued)

*Primary Examiner* — William McCalister
(74) *Attorney, Agent, or Firm* — Pauley Petersen & Erickson

(57) ABSTRACT

An apparatus for generating high-speed pulsed fluid jets. A valve assembly has a valve body with an inlet and an outlet. A valve shuttle is slidably or movably mounted with respect to the valve body. The valve shuttle is positioned within a cavity of the valve body and divides the cavity into an upper or inlet cavity and a lower or outlet cavity. The valve shuttle has a passage in communication with the upper cavity and the lower cavity. In an open condition of the valve assembly, fluid communication is formed between the inlet, the inlet cavity, the passage, the outlet cavity and the outlet.

13 Claims, 9 Drawing Sheets

(56) References Cited

OTHER PUBLICATIONS

Vijay M., Jiang M. and Lai M., "Computational Analysis and Visualization of High Frequency Pulsed Water Jet." Paper presented at 8th American Water Jet Conference. Houston, Aug. 1995.

Chahine G., Kalumuck K. and Frederick G., "The Use of Self Resonating Cavitating Water Jets for Rock Cutting." Paper presented at 8th American Water Jet Conference. Houston, Aug. 1995.

Foldyna J. and Sitek L., "Hydrodynamic Generator for Ultrasonic Modulation of the Jet: Basic Study." Paper #39, Proceeding of 2001 WJTA Water Jet Conference. Minneapolis, Aug. 2001.

Tieu, A.H., Yan W., Bai C., Vijay M.M. and Szemecko J., "The Removal of Hardened Grease Deposits From Steam Dryers in a Paper Mill, First Successful Contract Application of Forced Pulsed Waterjet." Paper #41, Proceeding of 2001 WJTA Water Jet Conference. Minneapolis, Aug. 2001.

Nebeker E.B., "Potential and Problems of Rapidly Pulsing Water Jets." Paper #B1, 7th International Symposium on Jet Cutting Technology. Ottawa, Jun. 1984.

Nebeker E.B., "Percussive Waterjets-State-of-the-Art." Paper presented at 4th U.S. Water Jet Conference. Berkeley, CA Aug. 1987.

Yan W., Bai C., Tieu A. and Vijay M.M., "Development and Design of Self-Rotating Forced Pulsed Waterjet: Basic Study and Applications." Paper 36, Proceeding of 2001 WJTA American WaterJet Conference. Minneapolis, Aug. 2001.

Cheng D.Z., Liang G., Lu C.X. and Xu Y., "Relationship between Water Cannon Design, Pulsed Waterjet Anatomy and Rock Breaking Effect." Paper presented at 3rd U.S. Water Jet Conference. Pittsburgh, May 1985.

Labus T.J., "A Material Failure Model for Pulsed Jet Impact." Paper presented at 4th U.S. Water Jet Conference. Berkeley, CA Aug. 1987.

* cited by examiner

METHOD AND APPARATUS FOR GENERATING HIGH-SPEED PULSED FLUID JETS

BACKGROUND OF THE INVENTION

The term "waterjet" denotes high-speed water jets generated at high static pressures with special pumps and nozzles. Such waterjets perform a wide range of useful work such as cleaning tanks, ship hulls and various structures and also cutting alloys and composite materials with computer-controlled nozzle movement. Static pressures of water as high as 80,000 pounds per square inch (psi) are generated with special motor-driven or engine-driven piston pumps and special fluid-powered pressure intensifiers, and with nozzles equipped with gem orifices. The term "waterjet technology" describes the various processes and applications of waterjets. The term "abrasive waterjet" describes a particular waterjet technology in which selected industrial abrasive particulates are added into the jet stream with special nozzles to further enhance the capability of waterjets. Very hard and difficult materials are cut or removed with such abrasive waterjets. In fact, it is the only method that can now be used to cut carbon-fiber laminates that are widely used in modern aircrafts.

The pumps and pressure intensifiers known for generating waterjets are positive-displacement piston pumps which have multiple pistons and check valves to build up the potential energy of a fluid. The energy transfer from the piston to the fluid is usually not smooth, due to factors such as fluid compressibility, the finite number of pistons in the pump, and the phase limitations. As a result, there are pressure pulsations in the output fluid. For example, a triplex crankshaft pump has only three cylinders and pistons operating at about 600 rotations per minute (rpm) and a double-acting hydraulic pressure intensifier has only two cylinders and pistons operating at about one stroke per second. These pumps are used to push or build water pressures from atmospheric to 55,000 psi or higher. The output pressure of water at the outlet of each cylinder is not phased properly with the output pressure of other cylinders to cover the entire cycle and to provide smooth pressure output. The rough power output is similar to automobile engines where the power output of a 3-cylinder engine is rougher or not as smooth as the power output of an 8-cylinder engine. Thus, if a waterjet nozzle is placed at the outlet of a triplex pump or a double-acting intensifier, the waterjet will not form a smooth stream. Instead, the waterjet will form a pulsed jet with a stream of water slugs. The water slugs are phased according to the piston motion of the pump. For example, a triplex pump operating at 600 rpm would generate a pulsed waterjet of 3×600=1800 pulses per minute. A double-acting intensifier operating at one stroke per second would produce a pulsed waterjet of 60 pulses per minute.

However, in waterjet applications, nozzles are not positioned next to the pump. Tubes or hoses are used to transport the pressurized water from the pump to a remote or distant nozzle. Inside the tubes or hoses the pressure pulsations in the water is damped and only a portion remain at the nozzle. In many applications, the residue pressure pulsations present no problem but in double-acting intensifiers there may be a problem. Due to the very low stroke rate and the extreme pressures involved, water at the nozzle of an intensifier pump system may have pressure pulsations too high for applications such as abrasive waterjet cutting of composites. An additional pressure attenuator may be required to further damp out the pressure variations. In such applications, the smoothness of a cut surface may be related to or a function of the pressure pulsation of the waterjet.

In many waterjet applications, a pulsed waterjet can be more effective than a continuous waterjet when each is at an identical pump power level. One reason is the mitigation of waterjet interference when a waterjet impacts a flat surface. When a continuous waterjet impacts a hard surface, the waterjet rebounds from the surface and collides with the incident waterjet. As a result, a significant portion of the waterjet energy is wasted. In a pulsed waterjet, the water slugs impact the surface individually and the energy of each slug of water has time to dissipate. If the waterjet slugs are phased properly, waterjet interference can be completely avoided. With a pulsed waterjet, the impact pressure on a surface can be greater if the mass of each water slug is greater. Reducing waterjet interference is one reason why waterjetting is widely applied today in industrial cleaning processes, such as by spinning a nozzle assembly at a high speed. Many waterjets generated at known pump pressures are supersonic, and it is difficult to avoid waterjet interference. Rotating a nozzle assembly at a high speed requires a rotating joint with good seals. The durability of such high-pressure seals is a maintenance issue in industrial processes. An impacting power of a waterjet is also reduced when the nozzle is rotating at a high speed.

There are many known investigations using pulsed waterjets for a wide range of jobs. One benefit of a pulsed waterjet is to remove materials, such as concrete, that have significant granular structures of materials. The waterjet pulses can better penetrate into pores of the porous structures, to rupture the structure and wash away the debris. Similar benefits of pulsed waterjet have been reported with coating removal. There are other benefits of using pulsed waterjets.

Even with the benefits of pulsed waterjets, the method is not applied widely today because the pulsed waterjet processes reported in several publications have not been commercialized. One highly publicized known pulsejet technology is not now commercialized, presumably because components involved in that particular pulsejet technology are not matured or there were technical difficulties not overcome. It is difficult to design an on-off valve for use with high-pressure water as the working fluid. To produce a pulsed waterjet at a nozzle is extremely difficult due to many factors. It is difficult to interrupt the flow of water at very high pressures.

Only some known pulsed waterjet processes are applied commercially, including one that uses an ultrasonic transducer placed at the tip of a waterjet nozzle to generate forced pulses at 20,000 cycles per second. Electrical energy is introduced into the nozzle assembly to generate the axial vibrations and forced waterjet pulses. Up to 1 kilowatt of electrical energy may be required to overcome the static water pressure at the nozzle. With this pulsed waterjet process it is possible to remove coatings at static pressures considerably lower than those associated with a conventional continuous waterjet. This 20 kHz pulsed waterjet process is not widely applied because of shortcomings and also the required electricity to power its nozzle. Mixing electricity and water in a handheld piece of field equipment is not a safe practice.

Pulsed waterjets are normally generated with available pumps. Once the pressure pulsations are dampened with tubes and hoses it can be difficult to recreate pressure pulsations at a waterjet nozzle. It is also difficult to interrupt the water flow at very high pressures. Problems, such as water hammer effect and metal fatigue, can occur if the flow interruption is not handled properly.

A process that allows a pulsed waterjet to be generated at a nozzle at a wide range of water pressures is valuable to the entire waterjet technology and would have applications in shipyards and concrete structure repairs and in everyday cleaning applications. It is particularly valuable if the process requires no energy from external or outside sources and requires no use of a heavy component with uncertain durability. This invention can be used to provide a waterjet process that produces a genuine pulsed waterjet by tapping a very small amount of water energy to produce waterjet pulses at a controllable frequency and at a wide range of static pressures. The apparatus and process of this invention will be valuable to waterjet technology and its use in industry.

SUMMARY OF THE INVENTION

This invention provides a method for generating a genuine pulsed fluid jet at a wide range of fluid pressures and flowrates without the need for an external power source or input and without the need for bulky, heavy, or unreliable equipment.

This invention can be used to generate a genuine pulsed fluid jet near or at a nozzle, to minimize the chance of pulsation dampening and to put the pulsejet to work.

This invention can incorporate the pulsejet technology into other mechanical and hydraulic systems to do useful work.

BRIEF DESCRIPTION OF THE DRAWINGS

This invention is explained in greater detail below in view of exemplary embodiments shown in the drawings, wherein.

DETAILED DESCRIPTION OF THE INVENTION

This invention provides a method for generating pulsed fluid flow without using an external power source. The energy consumed in the process is derived from the potential energy contained in a pressurized fluid from a pressurized source. It is known that a pressurized fluid such as compressed air and pressurized water contains an enormous amount of energy introduced into the fluid during the pumping process. In this invention, a very small amount of fluid energy is taken from the pressurized fluid to generate flow discontinuities in a suitable valve so that the flow discontinuities become fluid jet pulses, particularly if a nozzle is placed downstream from the valve. The amount of energy consumed in generating the flow discontinuities is so relatively small that the fluid jet usefulness is not affected. Also, flow discontinuities do not normally cause a water hammer effect in the fluid system because the flow of fluid is not cut off completely.

Figure 1:
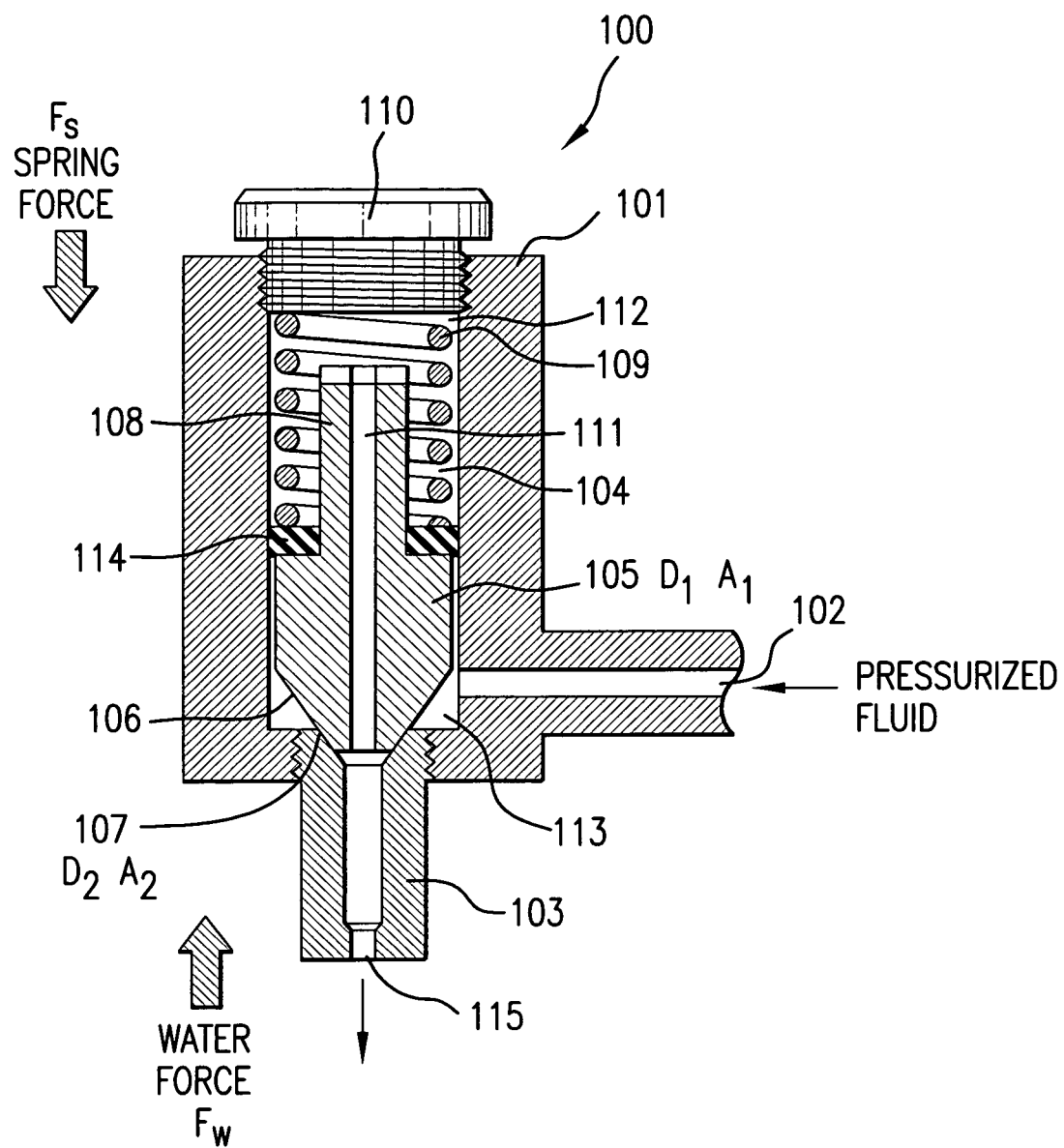
FIG. 1 is a cross-sectional view of a pulsejet valve/nozzle, in a closed position, according to one embodiment of this invention.

In one embodiment of a pulsed fluid jet generator of this invention, such as shown in FIG. 1, the pulsejet valve/nozzle 100 of this invention comprises a nozzle body 101 having a fluid inlet 102, a fluid outlet 103, and a cylindrical cavity 104 in communication with the inlet 102 and the outlet 103. Inside the cavity 104, a generally cylindrical valve poppet 105 has a tapered end 106 in contact with an outlet port 107 of the fluid outlet 103 and an other cylindrical end 108 accommodates a compression spring 109 that abuts the valve poppet 105 in one end and abuts a valve plug 110 on the other end. The valve poppet 105 has a central fluid passage 111. The valve poppet 105 divides the valve cavity 104 into two parts, an upper cavity 112 and a lower cavity 113. A poppet seal 114 can prevent fluid leakage across the valve poppet 105 although the valve poppet 105 is sized to fit the valve cavity 104 snugly, but is also free to slide up and down.

Figure 2:
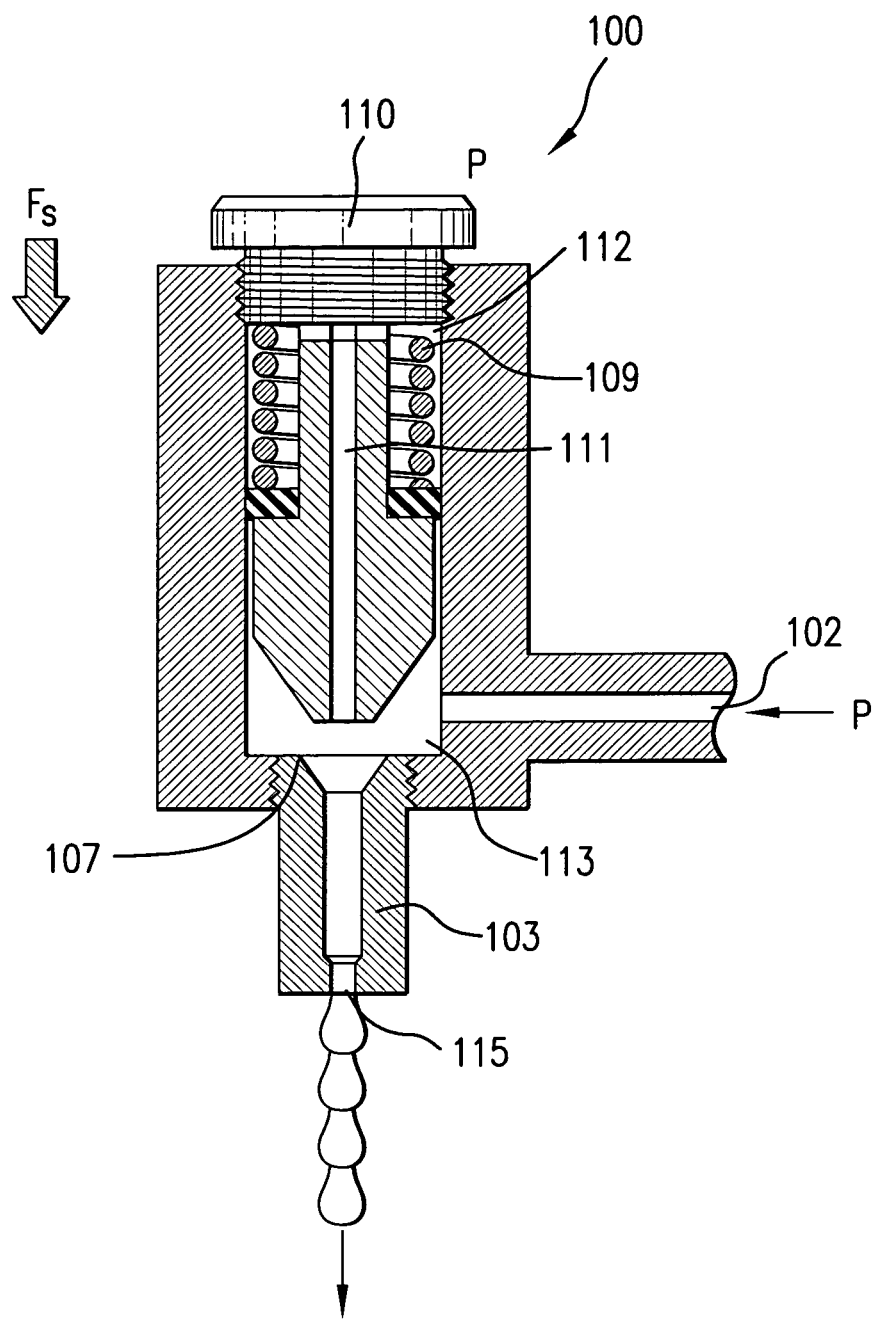
FIG. 2 is a cross-sectional view of the pulsejet valve/nozzle, as shown in FIG. 1, but in an open condition.

Still referring to FIG. 1, in some embodiments, the valve/nozzle assembly 100 of this invention is assembled with the valve poppet 105 in an upright position, relative to the direction shown in FIG. 1, and the spring 109 is compressed to exert a force on the valve poppet 105 urging it to butt against or abut the outlet port 107, thus closing the valve/nozzle 100. If fluid flows into this valve assembly, it will fill the lower cavity 113 but will be stopped by the valve poppet 105, from being discharged through the outlet 103. In some embodiments of this invention, the valve poppet 105 has a diameter D1 and a cross-sectional area A1. The tapered end 106 contacts the outlet port 107 to form a contact or a seal circle, or a ring, of a diameter D2 and of a cross-sectional area A2. Thus, in some embodiments, the valve poppet 105 has a donut-shaped cross-sectional area A1−A2=ΔA exposed to the fluid in the lower cavity 113. If the fluid is pressurized to a value of Pf psi, then the fluid exerts a fluid-induced force Ff of P×ΔA pounds of force against the valve poppet 105 in lifting it. At the same time, the spring 109 exerts a spring force Fs on the valve poppet 105 to keep it down. If Fs is greater than Ff, then the valve poppet 105 will stay in place and the valve remains closed. On the other hand, if Ff is greater than Fs, then the valve poppet 105 is pushed up by the pressurized fluid, thus opening the outlet port 107. The fluid will then flow from the inlet 102 through the lower cavity 113 to the outlet 103. At the same time, the fluid will also flow through the fluid passage 111 of the valve poppet 105 into the upper cavity 112. As a result, the pressurized fluid will be on both ends of the valve poppet 105 and the poppet lifting force Ff is eliminated or goes to zero. Here, the valve poppet 105 feels only the force from the spring 109 and thus moves down to close the outlet port 107, thus returning the valve assembly 100 back to its earlier state and completing one cycle of its pulsing action. This cyclic motion can continue automatically as long as the pressurized fluid supply continues. The fluid flow out of the valve assembly 100 will be chopped and if a nozzle 115 is placed at the outlet 103, a pulsed fluid jet will be formed, such as shown in FIG. 2.

One example can be used to further explain the valve assembly 100 of this invention. If the valve poppet 105 has a diameter of 0.5 inches, then its cross-sectional area inside the cavity 104 is 0.196 square inches. If the tapered end 106 of the valve poppet 105 contacts the outlet port 107 with a seal ring of 0.312 inches, a cross-sectional area of 0.076 square inches, then the cross-sectional area of the valve poppet 105 exposed to the fluid inside the lower cavity 113 when the valve is closed is ΔA=0.196−0.076=0.120 square inches. If the spring 109 exerts a force of 20 pounds on the valve poppet 105, then the outlet port 107 will be closed by this force. If a fluid such as water enters into the valve assembly 100, for example at 100 psi, then the valve will not open because the fluid induced force Ff=100×0.120=12 pounds force, which is smaller than the spring force of 20 pounds. However, if the fluid pressure is increased to 200 psi, the fluid force on the valve poppet 105 will be increased to 24 pounds, which is greater than the spring force 20 pounds, and the valve poppet 105 will move up to open the outlet port 107. This 200-psi pressurized water will then flow out of the valve assembly 100 but will also flow into the upper cavity 112 to balance the pressure across the valve poppet 105. The 4 pound force differential is eliminated or goes to zero, and the valve poppet 105 then moves down to close the outlet port 107. This cyclic motion can continue automatically as long as the force differential is significant and there is no appreciable fluid leakage across the valve poppet 105 with the valve in a closed condition. A pulsed waterjet can be generated at the nozzle 115. The frequency of this cyclic fluid motion is a function of the flow rate of the fluid and the size of the valve cavity. The fluid pressure determines if the valve will function but will not affect the cyclic frequency. The opening of the nozzle is one parameter that determines the flow rate at a given pressure. Because the spring 109 is compressed by the fluid during each cycle of valve operation, energy is consumed and lost in the form of heat.

The use of the compression spring 109 in the valve assembly 100 of this invention has limitations. Because a spring or bias element can fatigue and fail, the spring can supply only a relatively limited force. A spring of 20 pound compression force is considered to be a relatively strong spring and is classified commonly as a die spring but can only handle fluid of relatively low pressures. At relatively high fluid pressures, the fluid pressure inside the lower cavity 113 usually does not diminish much and the spring 109 may not return the valve poppet 105 to its closed position to complete a clean cycle or a complete cycle. Thus, the valve poppet 105 may get hung up to create a leak or a leaking valve. In some embodiments, eliminating the spring 109 results in a suitable force from the fluid.

Figure 3:
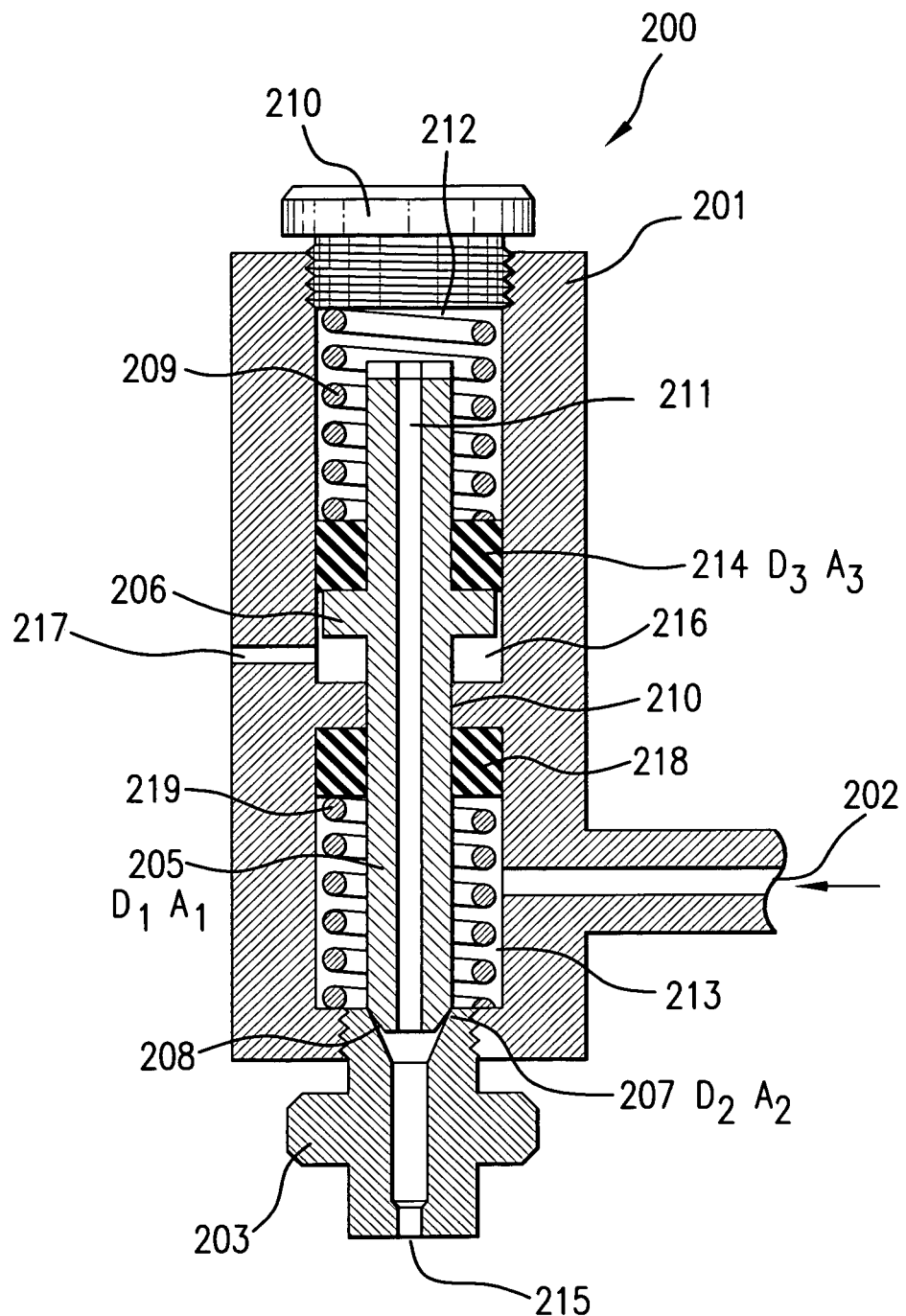
FIG. 3 is a cross-sectional view of a pulsing valve/nozzle assembly, in a closed condition, according to one embodiment of this invention.

An improved pulsing valve/nozzle assembly 200 of this invention is shown in FIG. 3. The valve assembly 200 comprises a valve body 201 having a fluid inlet 202, a fluid outlet 203, an upper cavity 212 and a lower cavity 213 connected by a passage 210. A valve poppet 205 has a shoulder 206 and a central fluid passage 211. The valve poppet 205 straddles across the upper cavity 212 and the lower cavity 213 through the passage 210. The valve poppet 205 has a tapered end 208 situated or positioned in the lower cavity 213 and the shoulder 206 in the upper cavity 212. There is a seal/bushing 214 around the valve poppet 205 in the upper cavity 212 that fits snugly against a cavity wall and around the valve poppet 205 to prevent fluid from leaking across the shoulder 206. The seal/bushing 214 and the shoulder 206 divide the cavity to an upper cavity 212 and a lower cavity 216. The lower cavity 216 has a small bleed hole 217 in communication with the outside environment. The valve poppet 205 is free to slide across the passage 210 for a short distance. The valve poppet 205 has a diameter D1 and a cross-sectional area A1 in the lower cavity 213 and a seal ring of diameter D2 and a cross-sectional area A2 when the valve poppet 205 is in contact with the outlet port 207. The valve poppet 205 and the seal/bushing 214 in the upper cavity 212 define a diameter D3 and a cross-sectional area A3. A spacer spring 209 can be inserted into the upper cavity 212 to keep the seal/bushing 214 in place and to urge the valve poppet 205 down, relative to the orientation shown in FIG. 3 when there is no fluid inside the valve/nozzle assembly 200. In some embodiments of this invention, D3 is greater than D2 and D1, and is much greater than D1−D2. In some embodiments of this invention, there can be a seal/bushing 218 and the spring spacer 219 in the lower cavity 213 serving a purpose similar to that of the seal/bushing 214 and the spacer spring 209 in the upper cavity 212. Any suitable nozzle 215 in the outlet 203 can be used to generate fluid jets.

As shown in FIG. 3, when a fluid of pressure P enters into the lower cavity 213, it encounters the surface A1−A2 and quickly exerts a force of Ff=P(A1−A2) to lift the valve poppet 205 up from the valve port 207. Once lifted, the entire cross-sectional area of the valve poppet 205 is exposed to the fluid. Thus a force of Ff=PA1 is exerted on the valve poppet 205 and pushes it to an uppermost position. Thus, the valve port 207 is wide open and the fluid flows through the outlet 203 and the nozzle 215. At the same time, the fluid flows into the upper cavity 212 through the fluid passage 211 and encounters the cross-sectional area A3 and exerts a force of Ff=P·A3 to push the valve poppet 205 down. Because the lower cavity 216 below the shoulder 206 is exposed to an atmosphere, there is a net downward force of P(A3−A1) to push the valve poppet 205 down. This force is very significant if D1 and D3 are relatively far apart. Because of this downward force, the valve poppet 205 will move down to close the outlet port 207 and thus complete one cycle of its up-and-down motion. This motion will continue as long as pressurized fluid continues to flow. A pulsed fluid jet can be generated at the nozzle 215.

Figure 4:
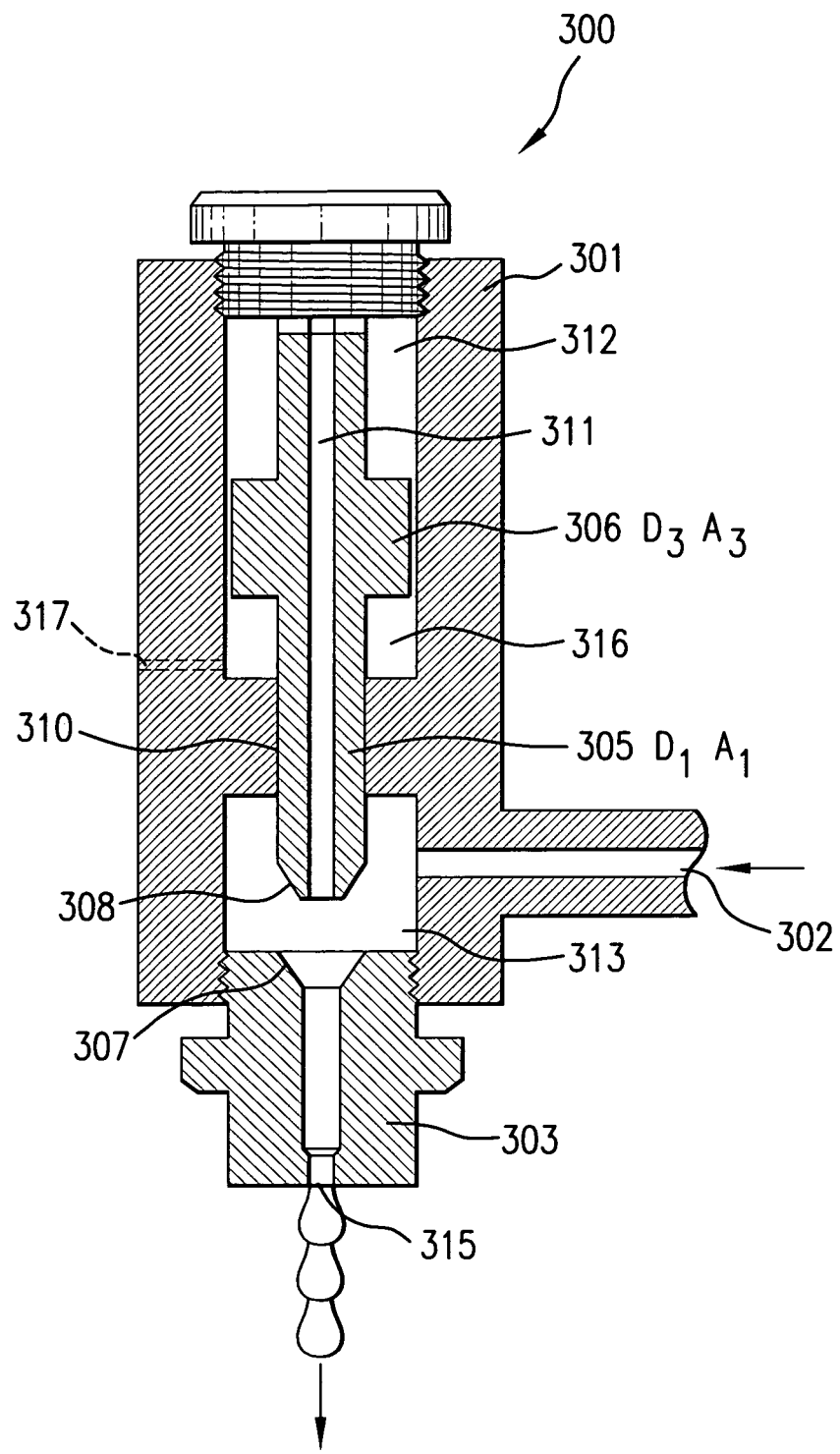
FIG. 4 is a cross-sectional view of a pulsing valve/nozzle assembly, in an open condition, according to another embodiment of this invention.

Another embodiment of a pulsejet valve/nozzle of this invention is shown in FIG. 4. In this embodiment, the seal/bushing assemblies are eliminated. The valve poppet 305 sits inside the upper cavity 312 and the passage 310 with a snug fit to minimize fluid leakage. A small fluid leakage rate may not affect the function of this valve/nozzle assembly and can actually lubricate and thus assist the motion of the valve poppet 305. One advantage of the valve/nozzle assembly 300 is its simple design. In some embodiments, one design requirement is that D3 be greater than D1 by a certain margin, which can be a function of the fluid pressure P and the sizing of the outlet port 307.

Figure 5:
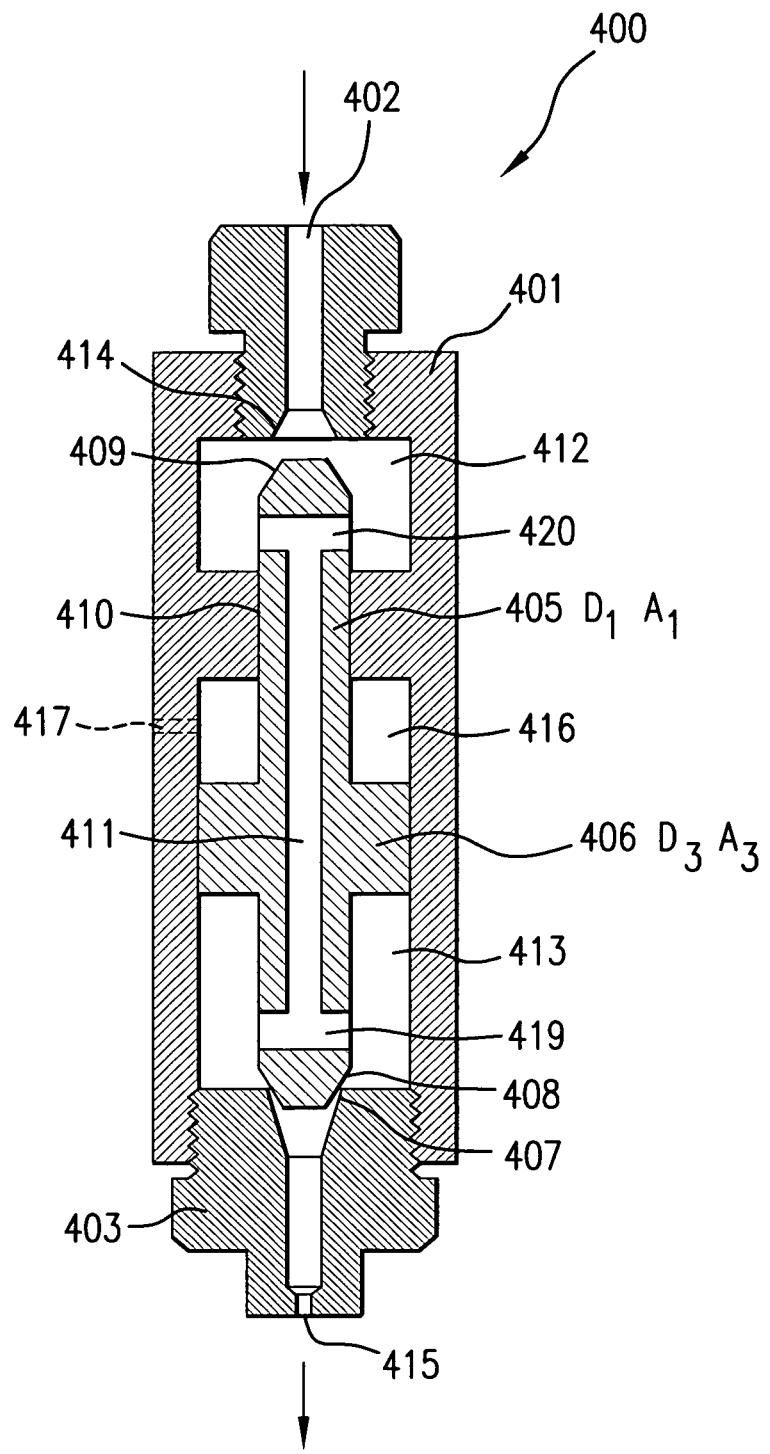
FIG. 5 is a cross-sectional view of a pulsejet valve/nozzle assembly, in a closed condition, according to another embodiment of this invention.

Another embodiment of a pulsejet valve/nozzle assembly of this invention is shown in FIG. 5. The valve/nozzle assembly 400 has an inline arrangement wherein a fluid flows into the valve body 401 from an upper inlet 402 into the upper cavity 412, through the fluid passage 411, and into the lower cavity 413. The valve poppet 405 straddles the upper cavity 412 and the lower cavity 413 through the passage 410. The valve poppet 405 has a tapered inlet end 409 and a tapered outlet end 408. The valve poppet 405 has a side inlet port 420 situated or positioned in the upper cavity 412 and the side outlet port 419 situated or positioned in the lower cavity 413. The inlet port 420 and the outlet port 419 are connected by the passage 411. The tapered inlet end 409 mates with valve inlet port 414 and the tapered outlet end 408 mates with the valve outlet port 407. The valve poppet 405 has a shoulder 406 that fits sealably or snugly inside the lower cavity 413. The valve poppet 405 is free to slide up and down between the inlet port 414 and the outlet port 407.

Figure 6:
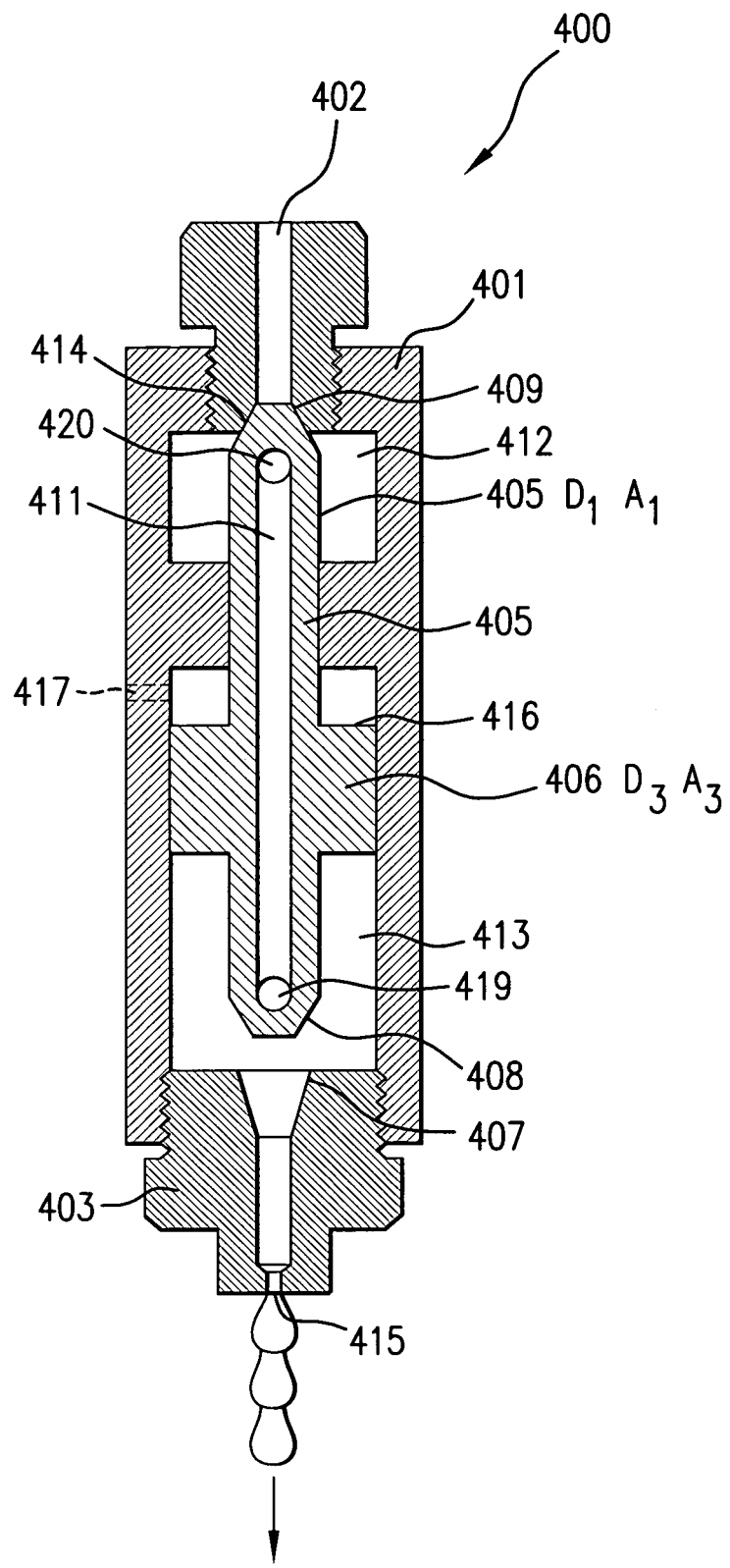
FIG. 6 is a cross-sectional view, with a valve shuttle rotated 90 degrees, of the valve/nozzle assembly as shown in FIG. 5, but in an open condition.

Referring to FIG. 6, when a pressurized fluid enters into the valve/nozzle assembly 400 through the inlet 402, it pushes down the valve poppet 405 and enters into the upper cavity 412 and into the side ports 420. The fluid then flows through the passage 411 and enters the lower cavity 413 through the side port 419. At this moment, the valve poppet 405 is down and the tapered outlet end 408 seals the outlet port 407 with a fluid induced force Ff=PA1, where A1 is a cross-sectional area of the valve poppet 405 in the upper cavity 412. The fluid of pressure P in the lower cavity 413 quickly sees the cross-sectional area of the poppet shoulder 406 and exerts a lifting force of a magnitude of P(A3−A1), where A1 is the cross-sectional area of the valve poppet 405 inside the lower cavity 413. This lifting force cancels the downward force P·A1 in the upper cavity 412. As a result, the valve poppet 405 moves up and opens the outlet port 407 and closes the inlet port 414. Simultaneously, the fluid inside the lower cavity 413 flows out of the nozzle 415. As the fluid pressure inside the lower cavity 413 diminishes, the lifting force on the valve poppet 405 is reduced to a level of less than the downward force inside the upper cavity 412, and the valve poppet 405 moves down to close the outlet port 407 and thus completes one cycle of the poppet movement. As long as the pressurized fluid flow continues, a pulsed fluid jet will be generated at the nozzle 415. Fluid flow may be interrupted inside the valve/nozzle assembly 400 but will not be blocked completely. Thus, there will be no water hammer effect in the fluid system. This inline pulsejet valve/nozzle assembly 400 of this invention has one advantage of a relatively slim construction and a simple or logical flow pattern ideally, which is suited for use with hand-held tools.

Figure 7:
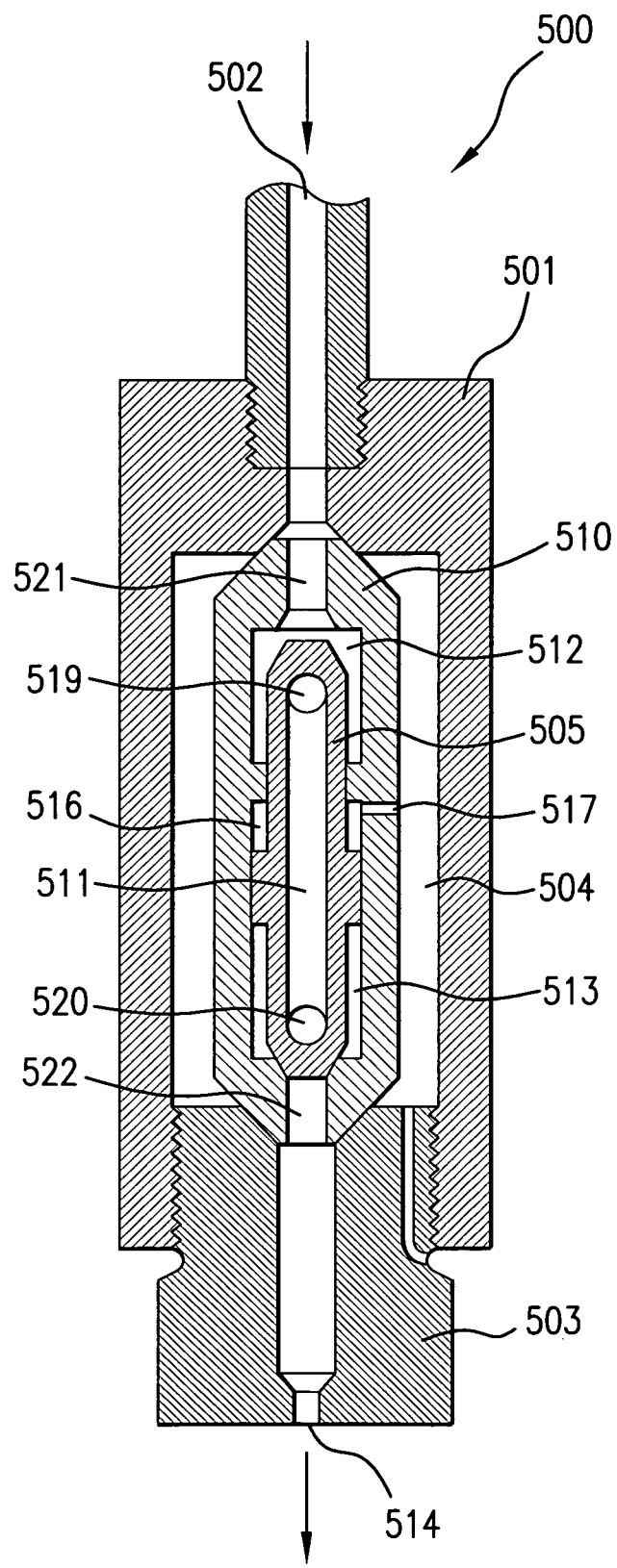
FIG. 7 is a cross-sectional view of a valve/nozzle assembly, in a closed condition, according to one embodiment of this invention.

Another embodiment of a pulsejet valve/nozzle assembly 500 is shown in FIG. 7, and comprises a valve body 501 having an inlet 502, a cylindrical cavity 504 containing a valve cartridge 510, and an outlet 503 with a nozzle 514. The valve cartridge 510 connects the inlet 502 to the outlet 503 in a fluid tight manner. The valve cartridge 510 can have a cylindrical shape and can contain a flow modulating mechanism, such as discussed in this specification. The valve cartridge 510 has an inlet 521, an inlet cavity 512, a poppet 505, an outlet cavity 513, and an outlet 522. The valve poppet 505 has an inlet side port 519, a central fluid passage 511, an outlet side port 520, and tapered ends to mate with the inlet 502 and outlet 503 of the valve cartridge 510. The valve cartridge 510 has a side bleed hole 517 connecting the cavity 516 inside the valve cartridge 510 to an outer atmosphere or the outside. When a pressurized fluid enters into the valve/nozzle assembly 500 of this invention, it flows into the valve cartridge 510 in which its flow is modulated by movement of the valve poppet 505 and the fluid can flow out of the nozzle 514 in the form of a pulsed jet. This cartridge arrangement can simplify the maintenance as the valve poppet 505 and its contact surfaces are subject to wear and the fluid leakage becomes too excessive. It is then the time for maintenance to replace the valve cartridge 510. This cartridge arrangement can also provide a cartridge having one of various lengths to be used inside the same nozzle body so that various flow modulation frequencies can be used.

In some fluid jet applications, a mass of each fluid jet pulse needs to be substantial so that the pulse frequency can be reduced, which relates to the so-called water cannon technology, particularly when the fluid is water. The water cannon technology is known and characterized by the high power of the fluid pulses that can cause significant damage when impacting a surface. This capability can be useful in many geotechnical applications. This invention can provide the necessary technology to meet the needs of water cannons.

Figure 8:
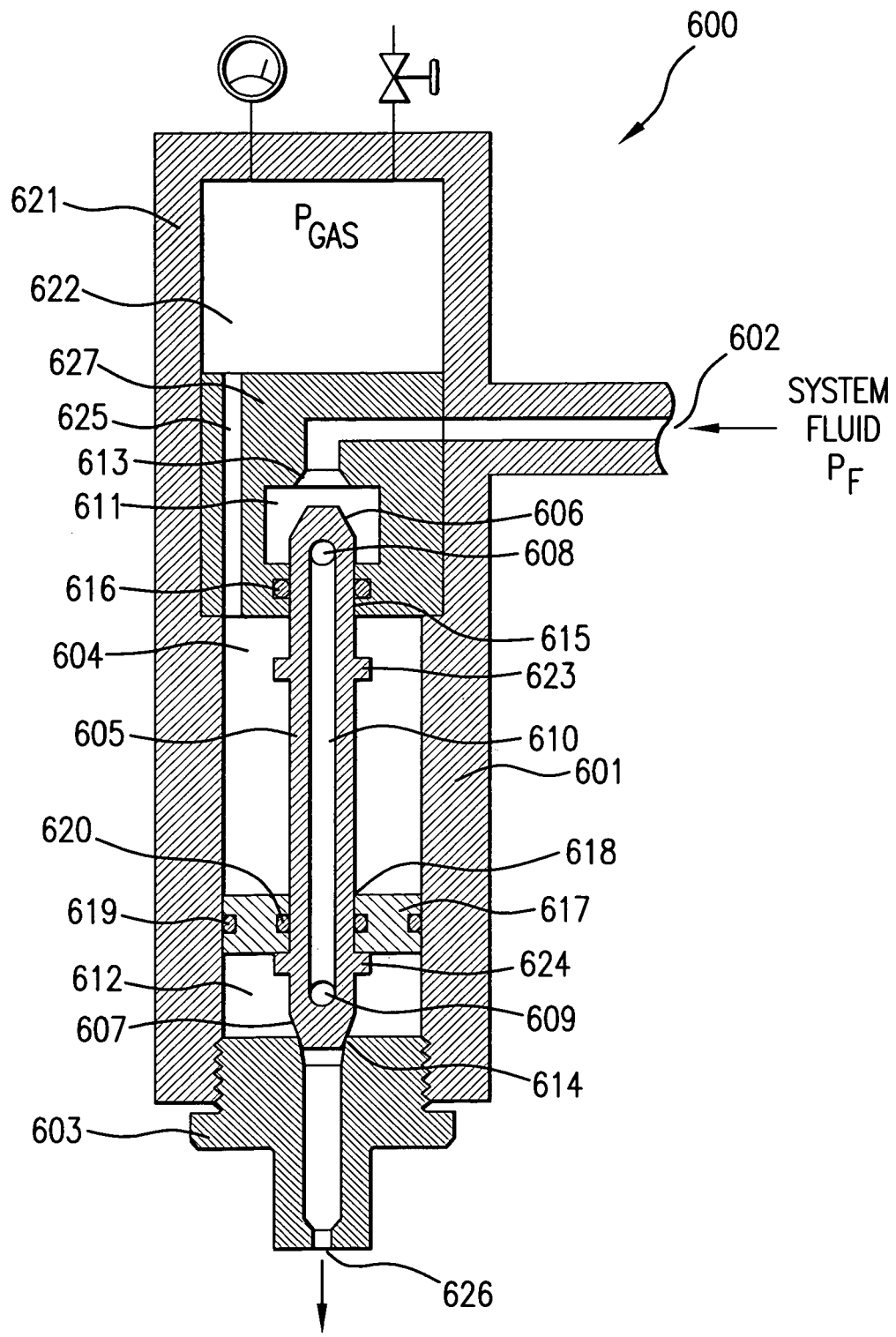
FIG. 8 is a cross-sectional view of a pulsejet generator, in a closed condition, according to one embodiment of this invention.

Referring to FIG. 8, a pulsejet generator 600 of this invention comprises a gas accumulator cylinder 621 connected to one end of a valve inlet head 627. The other end of the valve inlet head 627 is connected to a valve cylinder 601. The valve inlet head 627 has an inlet cavity 611 with a tapered inlet port 613 in communication with a valve inlet 602. The inlet cavity 611 has a tapered inlet port 613 connected to the valve inlet 602 and a central hole 615 that accommodates a cylindrical valve shuttle 605. The valve shuttle 605 has a tapered inlet end 606 that is mateable with the inlet port 613. The inlet cavity 611 has a seal 616 around the valve shuttle 605 to minimize fluid leakage. The valve cylinder 601 has a floating piston 617 that straddles around the valve shuttle 605 through a center hole 618. The piston 617 has an outside diameter seal 619 and an inside diameter seal 620 to isolate or separate the fluids. The valve shuttle 605 has a side inlet port 608 inside the inlet cavity 611, a central fluid passage 610, and an outlet side port 609 inside the outlet cavity 612. The valve shuttle 605 has an upper catch 623 in a gas cavity 604 on top of a piston 617 and a lower catch 624 in the outlet cavity 612 and below the piston 617. The two catches 623 and 624 on the valve shuttle 605 define a distance that the valve shuttle 605 can travel. The gas cylinder 621 has a gas cavity 622 connected to the gas cavity 604 by the passage 625 drilled through the valve inlet head 627. When the gas cylinder 621 is filled with a gas such as nitrogen or air to a pressure Pg, the gas will flow into the gas cavity 604 and will push the piston 617 down against the valve shuttle catch 624 and will move the shuttle 605 down to close the outlet port 614. The outlet port 614 is tapered to mate with the tapered outlet end 607 of the valve shuttle 605. As a result, the outlet port 614 can be closed by the valve shuttle 605 under a downward force exerted on the valve shuttle 605 in the cavity 611. The gas pressure Pg can be selected based on characteristics of the system fluid and the intended application. In different embodiments of this invention, Pg is smaller than the pressure of the system fluid entering into the pulsejet generator 600.

As a system fluid of pressure Pf flows into the inlet cavity 611 through the inlet 602, the fluid can follow the side inlet port 608, the passage 610 and the side outlet port 609 of the valve shuttle 605 and can enter into the cavity 612. Once in the cavity 612, the fluid encounters the closed outlet port 614 which it cannot open because of the fluid seating force in the cavity 611. The fluid also encounters the piston 617 and pushes it upward. By design, the gas pressure in the cavity 604 is lower than the fluid pressure in the cavity 612. Thus, the piston 617 can rise and eventually engage the catch 623 on the valve shuttle 605. Now, the valve shuttle 605 can rise if the gas pressure in the cavity 604 is lower than the fluid pressure in the cavity 612. The outlet port 614 can thus open and allow the system fluid to flow out or discharge. Now, the system fluid encounters the entire cross-sectional area of the outlet end 607 and pushes it up to keep the inlet port 613 closed until the fluid loses pressure. The piston 617 can move down with the fluid and engage the lower catch 624 to move the valve shuttle 605 down to the closed outlet port 614. Thus, the valve shuttle 605 and the piston 617 complete one cycle of their movement. When the flow of pressurized system fluid continues, a pulsed fluid jet can be generated at the nozzle 626. The cyclic movement of the piston 617 determines the frequency of the pulsejet and the volume of system fluid swept by the piston 617 determines the mass of each pulse. The gas pressure inside the gas cavity 604 can vary during each cycle because the gas is compressing and expanding but remains below that of the system fluid, otherwise the cyclic movement cannot continue. As a result, the pulsejet generated at the nozzle 626 varies in energy content in each slug of fluid, higher at the start of slug and lower at the end. The presence of a gas accumulator allows the use of a large nozzle to generate a pulsejet of high impact energy. If the gas accumulator is replaced with a strong spring, the ability to store energy can be limited and the operation may not be smooth.

In known waterjet operations, the water pressure often exceeds 10,000 psi, which is substantially higher than the gas pressure commonly employed in gas accumulator practices because gas at such high pressure becomes very dangerous and difficult to handle. To accommodate water at very high pressures, the gas accumulator used in the pulsejet generator 600 of this invention can be replaced with a gas pressure intensifier by incorporating a piston-plunger setup into the pulsejet valve/nozzle assembly of this invention. As a result, there is another embodiment of a pulsejet generator 700 of this invention, capable of handling system fluid of very high pressures. With this gas intensifier, a gas can be used to store energy at manageable pressures to accommodate water at pressures above 40,000 psi. Water, due to its non-compressible nature, is easier to handle than a gas at 4,000 psi.

Figure 9:
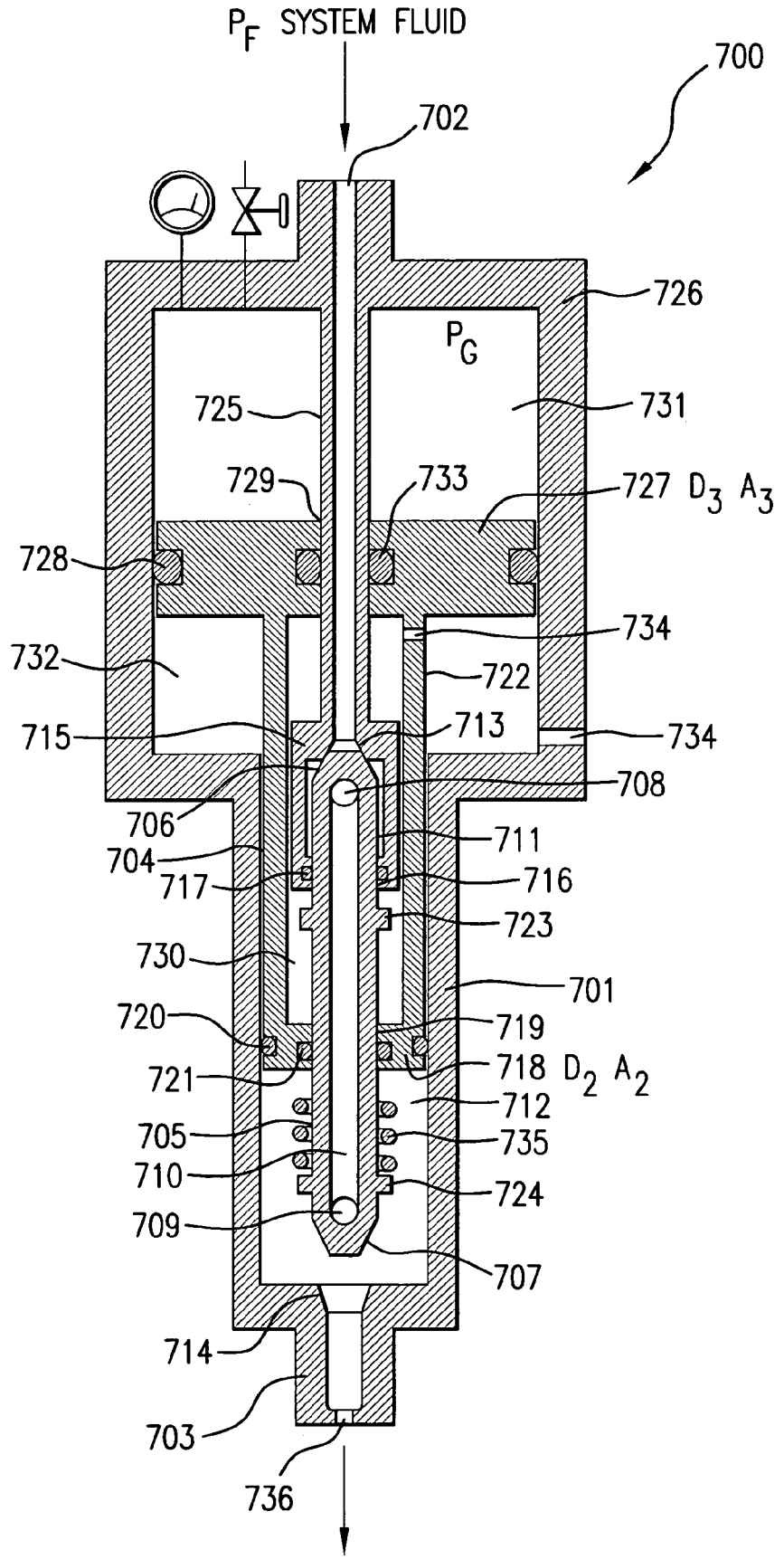
FIG. 9 is a cross-sectional view of a pulsejet generator, in an open condition, according to still another embodiment of this invention.

Referring to FIG. 9, the pulsejet generator 700 of this invention comprises a gas cylinder 726 with a gas chamber 731, a gas piston 727 housed in the gas chamber 731 with an associated piston seal 728, a valve body or a hollow valve cylinder 701 attached to the gas cylinder 726 on one end, a hollow plunger 722 attached to the gas piston 727 on one end which has an end cap 718 at the other end, a valve inlet head 715 situated inside the valve plunger 722, a fluid supply tube 725 in the center of the gas chamber 732 connecting an outside valve inlet 702 to the valve inlet head 715 through a center hole 729 on the gas piston 727, a cylindrical valve shuttle 705 straddling across the end cap 718, and a valve outlet 703 attached to the other end of the valve cylinder 701. The valve inlet head 715 has a first cavity or an inlet cavity 711 with a tapered inlet port 713 connected to the valve inlet 702. The inlet cavity 711 has a central hole 716 to accommodate the inlet end 706 of the valve shuttle 705 and a seal 717 around the valve shuttle 705 to prevent fluid leakage. The inlet end 706 is tapered to mate with the inlet port 713. The plunger end cap 718 has a center hole 719 to accommodate the . valve shuttle 705 and has an outside diameter seal 720 and an inside diameter seal 721 to prevent fluid leakage. The plunger end cap 718 defines a second cavity or an outlet cavity 712 and the plunger cavity 730, which is connected to the atmosphere through a bleed 734 on the hollow plunger 722 and on the gas cylinder 726. The valve shuttle 705 has a tapered outlet end 707 situated or positioned in the outlet cavity 712. The inlet end 706 has a side inlet port 708 situated or positioned in inlet cavity 711, an outlet side port 709 on the outlet end 707 in the outlet cavity 712, and an internal fluid passage 710 connecting the two side ports. The valve shuttle 705 comprises an upper catch 723 situated or positioned in the plunger cavity 730 and a lower catch 724 situated or positioned in the outlet cavity 712. The plunger end cap 718 can slide along the valve shuttle 705 between the two catches 723 and 724. A cushion spring may be placed between the plunger end cap 718 and the lower catch 724 to soften the contact.

Still referring to FIG. 9, the pulsejet generator 700 can be filled with a gas such as nitrogen or air in the gas chamber 731 to a pressure Pg, which can be determined by the pressure of the system fluid involved. The gas can push down the gas piston 727 and the plunger 722, and the plunger end cap 718 will then push down the valve shuttle 705 to close the outlet port 714. The pulsejet generator 700 can now be used to generate pulsed fluid jets.

When a pressurized system fluid, such as water, enters in the pulsejet generator 700 through the inlet 702 at a pressure Pw, it flows into the inlet cavity 711 through the supply tube 725. In the cavity 711, it exerts a force on the inlet end 706 of the valve shuttle 705 to push it down while the fluid flows through the valve shuttle 705 into the outlet cavity 712. In the outlet cavity 712, water sees or encounters the closed outlet port 714 and cannot open it. Instead, the water pushes the end cap 718 of the plunger 722 against the gas force acting on the piston 727. If the water force is greater than the gas force, then the plunger end cap 718 rises along the seated valve shuttle 705. Eventually, the plunger end cap 718 engages the upper catch 723. At this point, if the water force pushing up the plunger end cap 718 is still greater than the gas force acting on the piston 727, then the valve shuttle 705 can be moved or dislodged from the outlet port 714 and water can flow into the valve outlet 703 and discharge at the nozzle 736. At this time, water in the outlet cavity 712 sees the entire cross-sectional area of the outlet end 709 of the valve shuttle 705 and thus exerts a force pushing it upward to close the inlet port 713 of the valve inlet head 715 until water pressure inside the cavity 712 is reduced to a lower level. Once the outlet port 714 is open, the plunger end cap 718 can move down with the water and eventually engage the lower catch 724 and push down the valve shuttle 705 to close the outlet port 714. Thus, the valve shuttle 705 and the plunger 722 complete one cycle of their up-and-down movement. If the water supply is continued, the pulsed waterjet can be produced at the nozzle 736. A time period required to complete this cycle determines a frequency of the pulsed waterjet. The water pressure and the intensification ratio of the intensifier determine the energy content of the waterjet pulses. The intensification ratio is determined by the effective cross-sectional area of the gas piston 727 and the effective cross-sectional area of the plunger end cap 719. If this ratio is 20 and the gas pressure inside the gas chamber 731 is 2000 psi, the pulsejet generator 700 can handle water at pressures above 40,000 psi. The total volume of the gas chamber 731 can affect the amount of water energy that can be stored during each pulse. Thus, the energy content of each waterjet pulse can also be affected by the gas volume. The larger the gas chamber 731, the flatter can be the energy profile of a waterjet pulse. Greater energy in waterjet pulses often relates to greater power in doing work.

EXAMPLE 1

To better illustrate this invention, a pulse valve/nozzle 200 was constructed according to the embodiment shown in FIG. 3. The valve/nozzle 200 had a rectangular body 201 made of stainless steel with a side fluid inlet 202 of 0.156 inches in diameter, a cylindrical cavity 212 and 213 of 0.500 inches in diameter, and a bottom fluid outlet 203 of 0.156 inches in diameter. Attached to fluid outlet 203 was a nozzle 215 having a replaceable orifice. A valve shuttle 205 with the shoulder 206 was constructed of stainless steel and placed inside the upper cavity 212 with the seal/bushing 214 and 218. The valve shuttle 205 had a diameter of 0.312 inches and the shoulder 206 had a diameter of 0.498 inches. The seal/bushing 214 and 218 were made of brass disks and polymer packed in a sandwich form and fit the valve shuttle 205 and the cavities 212 and 213 snugly but otherwise the valve shuttle 205 was free to slide. A side bleed hole 0.047 inches in diameter was drilled on the side of valve/nozzle body 201, as shown in FIG. 3. The valve/nozzle body 201 was 2 inches wide, 3.7 inches long, and 1 inch thick. The valve shuttle 205 was 2 inches long with the shoulder 206 of 0.1 inches thick and the tapered outlet end 208 of 60 degrees, and had a central fluid passage 211 of 0.125 inches in diameter. The outlet port 207 had a taper of 59 degrees and a contact ring of 0.250 inches in diameter was formed when the valve shuttle 205 made contact with the valve port 207. Thus, a differential cross-sectional area of the valve shuttle 205 and the contact ring was 0.0764−0.0591=0.0273 square inches, which is the surface that fluid inside cavity 213 encountered while exerting an upward lifting force on the valve shuttle 205. When 70 psi tap water was introduced into the lower cavity 213, for example, a lifting force of about 2 pounds was produced.

When constructed, the pulsejet valve/nozzle 200 was closed because of the compression spring 209 inside the upper cavity 212. The spring 209 was relatively light, exerting an estimated force of less than 0.1 pound on the valve shuttle 205.

The valve/nozzle 200 was tested with 70-psi tap water. When the water was introduced into the inlet 202, a pulsed waterjet was issued or discharged at the nozzle 215, immediately. The nozzle 215 was inserted with a sapphire orifice of 0.052 inches in diameter. The oscillation of the valve shuttle 205 inside the valve body 201 could be felt and heard but the waterjet pulses were not clearly visible with naked eyes. The pulses were bunched too closely due to the high pulsating frequency, which was estimated at 100 cycles per second. However, photographing this pulsejet with a digital camera clearly revealed the water pulses.

EXAMPLE 2

A pulsejet generator was constructed according to the embodiment shown in FIG. 8. The pulsejet generator 600 was constructed with 1¼-inch Schedule-40 PVC pipe rated for pressures up to 370 psi, and with pipe components such as a tee, an elbow and end caps. A PVC tee was used as the centerpiece of the pulsejet generator 600. On one end of the tee was the gas accumulator 621 which was made of a 5-inch long section of PVC pipe and a cap and the other end was the valve cylinder 601 made of a 6-inch-long PVC pipe, an end plug, and a cap. The overall length of the assembled accumulator/valve cylinder combination was about 15 inches. A fluid inlet head 627 made of stainless steel was positioned in the center of the tee and had a fluid passage connected to the fluid inlet 602. The inlet head 627 had a fluid inlet cavity 611 and a tapered inlet port 613 that mated with the tapered inlet end 606 of the valve shuttle 605. The valve shuttle 605 was made of stainless steel and was 0.500 inches in diameter, 5 inches in length, and was machined to have the upper catch 623 and the lower catch 624 of 0.063 inches in height and 0.010 inches in thickness. The valve shuttle 605 had ends with a 60-degree taper and had the inlet side port 608 and the outlet side port 609 connected by an internal fluid passage 610. The side ports were 0.125 inches in diameter and the fluid passage 610 was 0.250 inches in diameter. Generator 600 had a gas piston 617 straddling around the valve shuttle 605 between the catch 623 and the catch 624. The gas piston 617 had an outside diameter of 1.312 inches and a center hole of 0.500 inches in diameter and was fitted with an outside diameter seal 619 and an inside diameter seal 620 around the valve shuttle 605, and could travel a maximum distance of 3.0 inches between the catch 623 and the catch 624. The volume of space swept by the gas piston 617 during its maximum travel was 3.3 cubic inches. The gas piston 617 divided the valve cylinder interior space into two parts, an upper gas cavity 604 and a lower outlet cavity 612. The gas in the accumulator 622 could flow into the gas cavity 604 by the passage 625 drilled through the inlet head 627. The valve shuttle 605 straddled across three cavities, the inlet cavity 611, the gas cavity 604 and the outlet cavity 612. The valve shuttle catch 623 was situated or positioned in the cavity 604 and the catch 624 situated or positioned in the cavity 612.

Still referring to FIG. 8, when the accumulator 622 was filled with compressed air to 60 psi, the gas piston 617 was pushed down with the valve shuttle 605 to close the outlet port 614. The generator 600 was then ready for generating a pulsed fluid jet of choice. In this case, compressed air of 90 psi was selected as the system fluid in order to generate a pulsed air jet for a special application. When the 90-psi compressed air entered into the upper cavity 612, it saw but could not open the closed outlet port 614. Instead, the 90-psi air started to push the gas piston 617 upward with a total force of about 100 pounds, which was greater than the downward force of about 69 pounds on the gas piston from the 60-psi air in the accumulator 621. As a result, the gas piston 617 started to move up while the outlet port 614 remained closed. After traveling for 3 inches, the gas piston 617 made contact with the upper catch 623 and exerted a lifting force on the valve shuttle 605 to open the outlet port 614 and to close the inlet port 613. At this moment, 90-psi air in the cavity 612 saw the entire cross-sectional area of the valve shuttle 605, thus exerting a force to keep the inlet port 613 closed. The 90-psi air in the cavity 612 started to flow out of the nozzle under the pushing force of the gas piston 617. Quickly, the gas piston 617 caught up with the lower catch 624 and the valve shuttle 605 moved down to close the outlet port 614, thus completing one cycle of the valve operation. This up-and-down movement of the gas piston 617 continued and the pulsed air jet was generated at the nozzle, which had an opening of 0.75 inches. The pulsed air jet was very unique due to the substantial amount of energy it packs. When generated in water, the air jet could propel a small boat such as a kayak or canoe. On the other hand, a continuous stream of compressed air would not be suitable for such use. Likewise, the pulsed air jet or other fluid jet from the generator 600 of this invention will find many other applications.

EXAMPLE 3

A pulsejet generator 700 was constructed for water applications according to the embodiment shown in FIG. 9. The generator 700 was made of two attached cylinders, an upper gas cylinder 726 made of carbon steel and a lower water cylinder 701 made of hardened stainless steel. The gas cylinder 726 was 9 inches long and 3.5 inches in diameter and the water cylinder 701 was 5.25 inches long and 2.5 inches in diameter for an assembled overall length of 14.5 inches. The gas cylinder 726 had a gas chamber 731 of 2.5 inches in diameter and housed a gas piston 727 made of aluminum alloy and was fitted with a polymeric outside diameter seal 728. A hollow plunger 722 made of hardened stainless steel was attached to the gas piston 727 on one end and was fitted with an end cap 718 on the other end. The plunger 722 was housed inside the water cylinder 701 and was free to slide. The plunger end cap 718 was made of hardened stainless steel and was fitted with a polymeric outside diameter seal 720 and a polymeric inside diameter seal 721 around a cylindrical valve shuttle 705. The valve shuttle 705 was made of hardened stainless steel and was 0.250 inches in diameter, 3.25 inches long, and had tapered ends 706 and 707 of 60 degrees. The valve shuttle 705 also had side ports 708 and 709 of 0.094 inches diameter and an inside fluid passage 710 of 0.125 inches in diameter connecting the two side ports 708 and 709. The valve shuttle 705 also had machined catches 723 and 724 of 0.063 inches high and 0.010 inches thick.

Still referring to FIG. 9, the constructed pulsejet generator 700 had a water supply tube 725 placed in the center of gas cylinder 726 connecting the outside water inlet 702 to a valve inlet head 715 situated or positioned inside the hollow plunger 722. The water tube 725, made of stainless steel, was 0.250 inches in outside diameter, was 0.094 inches in inside diameter, and was 6.5 inches in length. The valve inlet head 715, made of stainless steel, was 0.560 inches in outside diameter and 1.0 inch in length, and had a tapered inlet port 713 of 60 degrees, an inlet cavity 711 of 0.312 inches in diameter, and a shuttle opening of 0.250 inches in diameter fitted with a polymeric seal 717. The valve shuttle 705 straddled across cavities 711, 730, and 712 with its inlet side port 708 situated or positioned in the cavity 711 and its outlet port 709 in the cavity 712. Seals 717, 720 and 721 kept fluid leakage to a minimum. The cross-sectional area of the gas piston 727 was 4.91 square inches and the cross-sectional area of water tube was 0.049 square inches. Thus, the effective gas surface area on the gas piston 727 was 4.91−0.049=4.857 square inches. The cross-sectional area of plunger end cap 718 was 0.52 square inches. Thus, the intensification ratio of the pressure intensifier was 4.857÷0.52=9.34. This intensification ratio indicates that the maximum water pressure the pulsejet generator 700 could accommodate is 9.34×Pg, with Pg being the gas pressure inside the gas chamber 731.

The pulsejet generator 700 was filled with compressed air to 300 psi. The gas piston 727 was pushed down by the compressed air and the outlet port 714 was closed. Tap water pressurized to 2000 psi from a motorized jet washer was introduced into the pulsejet generator 700, and a pulsed waterjet issued or discharged immediately at the nozzle 736, which had a sapphire orifice of 0.052 inches in diameter. The waterjet pulses could be seen with the naked eye and the modulating motion of the valve shuttle inside the generator was felt by hand. The frequency was estimated to be less than 20 cycles per second and the volume of water per pulse was estimated to be less than 0.5 cubic inches. The resultant pulsed waterjet appeared to be quite powerful and compared very favorably against a conventional straight waterjet issued or discharged by the same nozzle in impacting against a concrete block.

While in the foregoing specification this invention has been described in relation to certain preferred embodiments thereof, and many details have been set forth for purpose of illustration, it will be apparent to those skilled in the art that this invention is susceptible to additional embodiments and that certain of the details described herein can be varied considerably without departing from the basic principles of this invention.

What is claimed is:

1. An apparatus for generating high-speed fluid jets, the apparatus comprising:
   a valve body having a valve cavity, an inlet, and an outlet, a valve shuttle slidably mounted with respect to said valve body within said valve cavity, said valve shuttle dividing said valve cavity into a first cavity and a second cavity, said valve shuttle movable between a closed position and an open position with respect to a valve assembly, said valve shuttle having a fluid passage, in said open position said fluid passage in communication with said outlet, said first cavity and said second cavity, in said closed position said valve shuttle preventing communication between said inlet and said outlet, said valve shuttle oscillating between said open position and said closed position when pressurized fluid flows through said valve assembly, the pressurized fluid inside said valve assembly urging said valve shuttle to move alternatively between said open position and said closed position, said inlet communicating with said first cavity, said outlet communicating with said second cavity, said fluid passage communicating with said outlet, said second cavity, and said first cavity in said open position, said fluid passage communicating with said inlet, said first cavity and said second cavity in said closed position, and in said closed position said valve shuttle preventing communication between said inlet and said outlet, a volume of said second cavity being variable and defined by said valve cavity, a first position of said valve shuttle, and a second position of a shuttle piston slidably mounted about said valve shuttle within said second cavity, and said shuttle piston dividing said second cavity into an outlet cavity in communication with said outlet and a bias cavity having a source of a bias force.

2. An apparatus according to claim 1 wherein a bias element within said second cavity urges said valve shuttle to said closed position and a valve poppet has a side inlet port in communication with said valve cavity.

3. An apparatus according to claim 1 wherein said valve shuttle has an inlet end shaped to sealably mate with an inlet port in communication with said valve inlet and an outlet end shaped to sealably mate with an outlet port in communication with said valve outlet.

4. An apparatus according to claim 3 further comprising a first seal being mounted about said valve shuttle and sealing said valve shuttle from said first cavity and a second seal being mounted about said valve shuttle and sealing said valve shuttle from said second cavity.

5. An apparatus according to Claim 1 wherein at least one seal is mounted with respect to said shuttle piston to isolate said outlet cavity from said biasing cavity and said shuttle piston is movable along said valve shuttle over a fixed distance that corresponds to a maximum volume and a minimum volume of said outlet cavity.

6. An apparatus according to claim 5 wherein a travel of said shuttle piston along said valve shuttle is a function of a force of a fluid in said outlet cavity on a first side and of said bias force on a second side and said shuttle piston oscillates between a first fixed point along said valve shuttle corresponding to said open position of said valve assembly and a second fixed point along said valve shuttle corresponding to said closed position of said valve assembly.

7. An apparatus according to claim 6 wherein said fluid passage communicates with said first cavity, said second cavity and said outlet at said first fixed point in said open position of said valve assembly, and said fluid passage communicates with said inlet, said first cavity and said second cavity at said second fixed point in said closed position of said valve assembly.

8. An apparatus according to claim 6 wherein a bias spring supplies said bias force acting on said shuttle piston.

9. An apparatus according to claim 6 wherein a pressurized gas supplies said bias force acting on said shuttle piston.

10. An apparatus according to claim 6 wherein said shuttle piston comprises a front end of a hollow cylinder slidably mounted inside said valve cavity and outside said valve shuttle and a valve inlet head and an other end of said hollow cylinder abuts a larger gas piston that generates said bias force acting on said shuttle piston.

11. An apparatus according to claim 10 wherein said gas piston is housed inside a gas cylinder and said gas piston has at least one third seal to contain said pressurized gas, and a first diameter of said gas piston is larger than a second diameter of said shuttle piston.

12. An apparatus according to claim 11 wherein said gas piston has a central passage and a third seal to accommodate an inlet tube that connects to a fluid inlet outside of said gas cylinder on one end and connects to said inlet head situated inside said hollow cylinder on an other end, said inlet head having said inlet cavity with a seal to mate with one end of said valve shuttle, an other end of said valve shuttle being in said second cavity, and said gas piston oscillating inside said gas cylinder along said inlet tube and corresponding to a movement of said shuttle piston along said valve shuttle.

13. An apparatus according to claim 12 wherein a first pressure of a gas inside said gas cylinder is chosen according to a pressure of a system fluid flowing into said valve assembly and a diametrical ratio of the said gas piston and said shuttle piston by a formula that a product of said gas pressure and said diametrical ratio is not greater than a second pressure of the system fluid at all times.

* * * * *